(12) United States Patent
Kifuku et al.

(10) Patent No.: US 6,741,053 B2
(45) Date of Patent: May 25, 2004

(54) STEERING CONTROL DEVICE

(75) Inventors: Takayuki Kifuku, Tokyo (JP); Katsuhiko Ohmae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/267,733

(22) Filed: Oct. 10, 2002

(65) Prior Publication Data
US 2003/0155879 A1 Aug. 21, 2003

(30) Foreign Application Priority Data
Feb. 21, 2002 (JP) ...................................... 2002-044338

(51) Int. Cl.[7] ............................................... H02P 7/00
(52) U.S. Cl. ......................... 318/434; 318/432; 701/41
(58) Field of Search ................................. 318/432, 434; 701/36, 41

(56) References Cited

U.S. PATENT DOCUMENTS

| 4,361,202 A | * | 11/1982 | Minovitch | 180/168 |
| 4,882,586 A | * | 11/1989 | Dolph et al. | 341/169 |
| 6,009,364 A | * | 12/1999 | Wada et al. | 701/43 |
| 6,519,518 B1 | * | 2/2003 | Klein et al. | 701/41 |

FOREIGN PATENT DOCUMENTS

| JP | 01-257674 | 10/1989 |
| JP | 06-227410 | 8/1994 |
| JP | 08-091236 | 4/1996 |
| JP | 2000-142447 | 5/2000 |

* cited by examiner

Primary Examiner—Rita Leykin
(74) Attorney, Agent, or Firm—Sughrue Mion, PLLC

(57) ABSTRACT

A steering control device is realized which is capable of handling a variety of torque sensors through the same signal processing circuit, and in which a cost increase is suppressed while taking sufficient failsafe measures, having a torque sensor for detecting a signal corresponding to a steering torque in a steering system; a first microcontroller for outputting a steering torque signal equivalent to the steering torque; a second microcontroller for controlling an actuator based on the steering torque signal outputted; actuator driving means for driving the actuator controlling the steering system; and storage means in which a steering torque neutral point compensation data is stored in advance; wherein the first microcontroller compensates a neutral point of the steering torque signal based on the neutral point compensation data stored in the storage means.

19 Claims, 9 Drawing Sheets

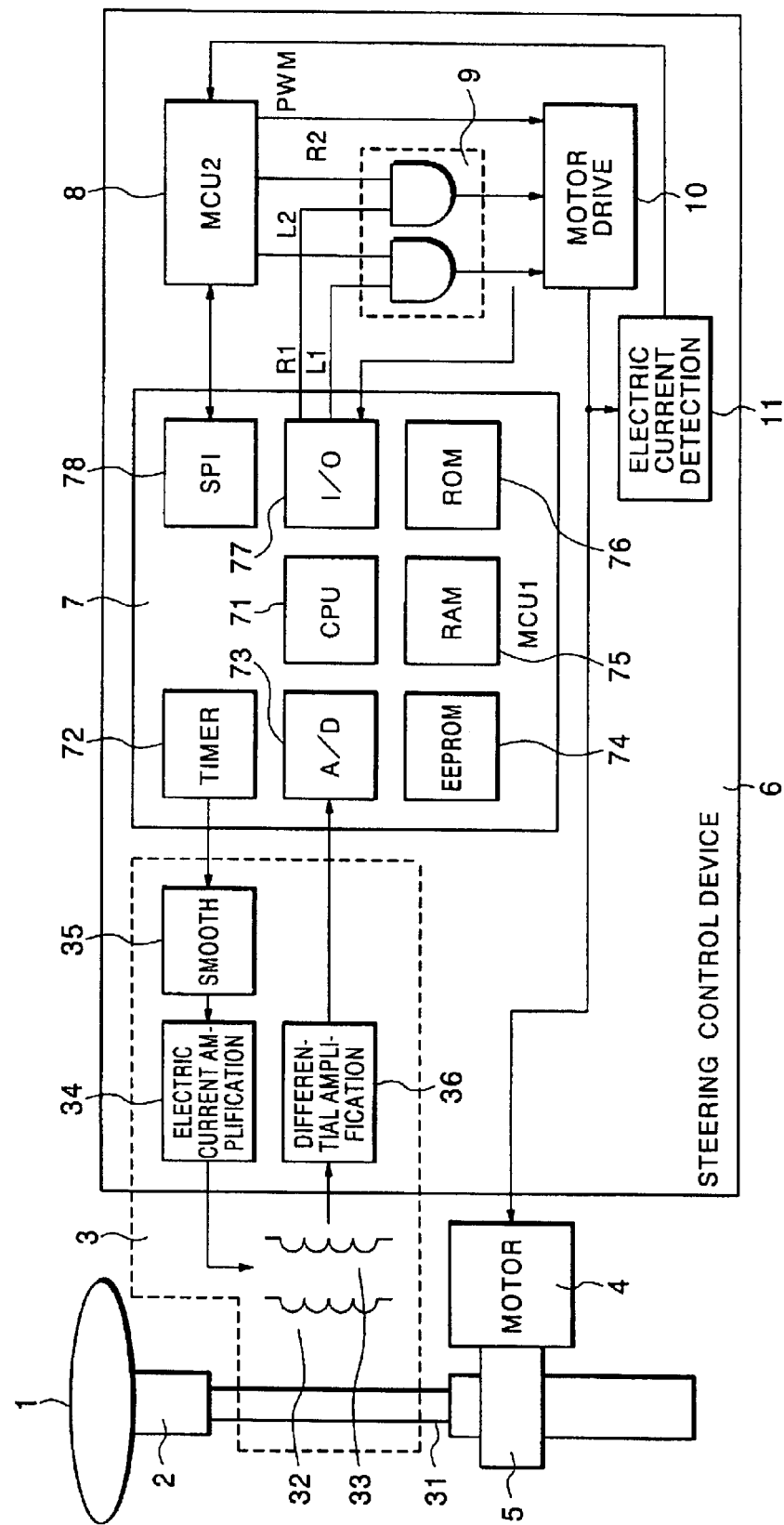

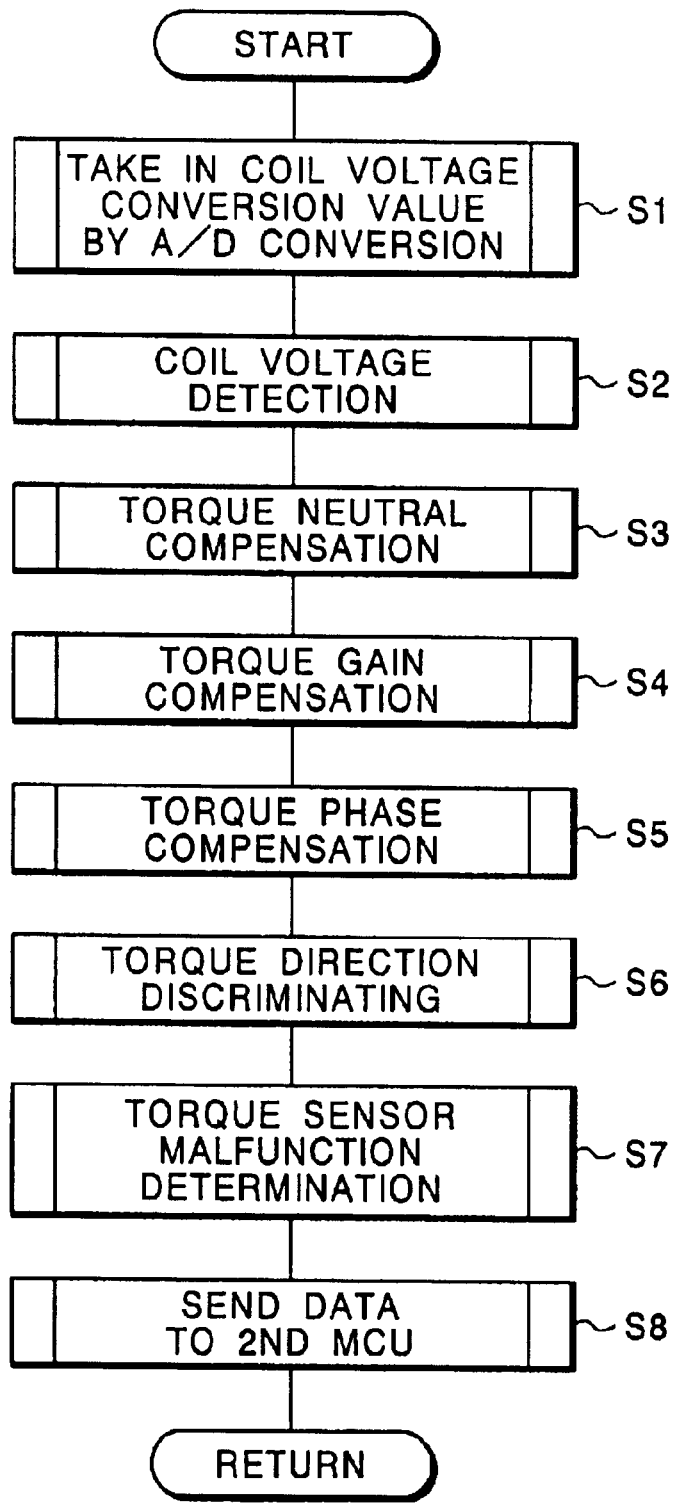

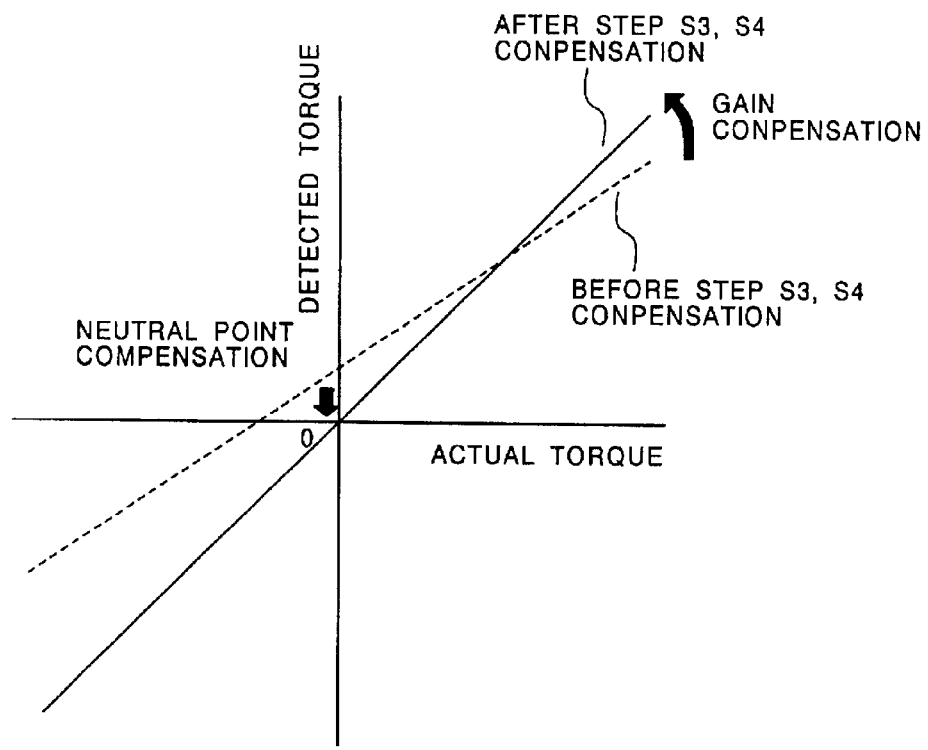
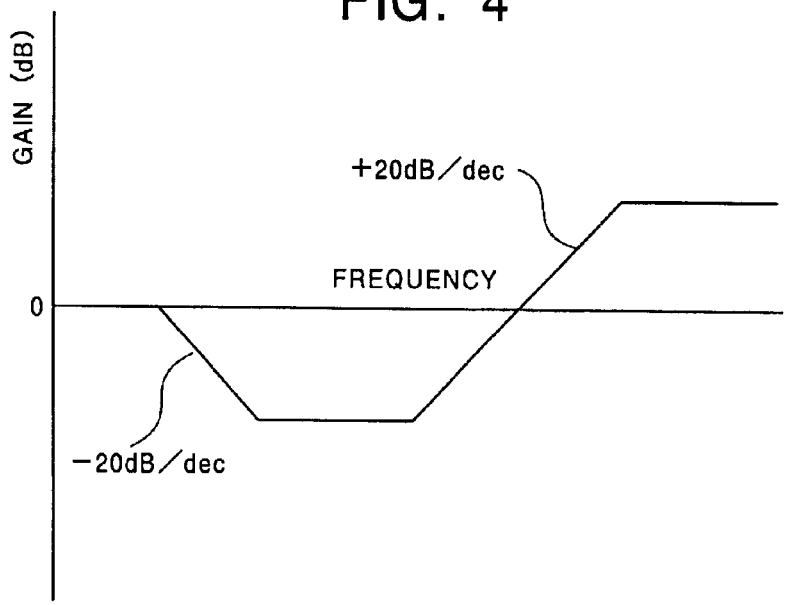

STEERING CONTROL DEVICE

BACKGROUND OF THE INVENTION

1. Field of the Invention

The present invention relates to a steering control device for use in an automobile or the like.

2. Description of the Related Art

There are various methods for realizing a torque sensor for detecting a steering torque in a steering system of an automobile or the like. In particular, a variety of methods have been proposed for a signal processing unit that converts the detected steering torque into an electrical signal.

FIG. 11 is a block diagram showing a signal processing circuit in a typical conventional torque sensor disclosed in Japanese Patent No. 3051903, for example.

The torque sensor of this conventional technique includes, as a torque detecting unit mounted to a steering column, a torsion bar for converting the steering torque into a torsion angle, a torque detecting coil for converting the torsion angle converted by the torsion bar into an inductance value, and a temperature compensating coil for compensating for a temperature characteristic of the torque detecting coil.

Further, as a signal processing circuit connected to each coil, the torque sensor is provided with an exciting circuit for each coil, a differential amplifying circuit to compensate for the temperature characteristic of the coil, and a wave detecting circuit for detecting a steering torque signal.

Hereinafter, FIG. 11 is used to explain the signal processing circuit of the present torque sensor in more detail. In FIG. 11, reference numeral 12 is the torque detecting coil and reference numeral 13 is the temperature compensating coil for compensating the temperature characteristic of the torque detecting coil 12.

Reference numeral 14 is an oscillating circuit for oscillating an alternating voltage of a given frequency and reference numeral 15 is a reference voltage circuit for generating a reference voltage. The torque detecting coil 12 and the temperature compensating coil 13 are driven and excited at a given frequency based on the outputs of the oscillating circuit 14 and the reference voltage circuit 15.

Further, reference numeral 16 is the differential amplifying circuit for reading out the difference between the terminal voltages of the torque detecting coil 12 and of the temperature compensating coil 13 to compensate the temperature characteristic of the torque detecting coil 12, and also to amplify the difference between the terminal voltages.

Reference numeral 17 is a synchronous timing circuit for outputting a timing signal in accordance with the given frequency alternating current outputted from the oscillating circuit 14. Reference numeral 18 is the detecting circuit for eliminating frequency elements that are driven by the oscillating circuit 14 from the amplifying circuit 16 output signal, based on the timing outputted by the synchronous timing circuit 17, to obtain the steering torque signal.

FIG. 12 shows waveforms of each part in the signal processing circuit in the conventional torque sensor as described above. In FIG. 12, (a) indicates a waveform $V_o$ of an alternating voltage signal of a predetermined frequency, which is output from the oscillating circuit 14. In FIG. 12, (b) is a timing signal $V_T$ produced when the alternating voltage signal waveform $V_o$ goes through the synchronous timing circuit 17 and is inputted into the detecting circuit 18.

Here, in FIG. 12, (c) through (f) indicate waveforms at each part when a steering wheel not shown in the diagram is rotated to the right, for example, and torque is applied to the steering column.

A solid line in (c) shown in FIG. 12 indicates an output voltage $V_2$ from the circuit with the torque detecting coil 12. A broken line in (c) shown in FIG. 12 indicates an output voltage $V_1$ from a circuit with the temperature compensating coil 13. The voltage difference between the output voltages $V_1$ and $V_2$ is amplified by the differential amplifying circuit 16 as output voltage having an alternating current waveform $V_3$ in (d) shown in FIG. 12.

Further, in (e) shown in FIG. 12, detection of the alternating current waveform $V_o$ is performed by the detecting circuit 18 when the timing signal $V_T$ is positive, whereby an output voltage $V_4$ having pulsating flow waveform is obtained from the voltage during a positive period of the alternating current waveform $V_3$.

In (f) shown in FIG. 12, the output voltage $V_4$ is smoothed and a voltage level $V_L$, which is equivalent to an average value of the output voltage $V_4$, is detected at a level that is higher than a non-steering time voltage level $V_N$ discussed below.

Similarly, in FIG. 12, (g) through (j) indicate waveforms at each part when the steering wheel, which is not shown in the diagram, is rotated to the left and torque is applied to the steering column. In (j) shown in FIG. 12, the output voltage $V_4$ is smoothed and a voltage level $V_L$, which is equivalent to an average value of the output voltage $V_4$, is detected at a level that is lower than the non-steering time voltage level $V_N$ discussed below.

Next, since the torque is not applied at a time when the steering wheel is not being steered, the output voltages $V_1$ and $V_2$ have identical voltage waveforms, as in (k) shown in FIG. 12. As a result, the difference voltage at the differential amplifying circuit 16 is not generated, as in (l) shown in FIG. 12, and a change does not occur at the detecting circuit 18, as in (m) shown in FIG. 12. Accordingly, the voltage level becomes a voltage level $V_N$, which is lower than the smoothed output level $V_H$ obtained when the above-mentioned right-rotation steering is performed, but is higher than the voltage level $V_L$ obtained when the left-rotation steering is performed, as in (n) shown in FIG. 12.

As described above, in the signal processing circuit in the conventional torque sensor, the temperature characteristic of the torque detecting coil 12 is compensated so that the steering torque signals having the voltage levels shown in (f), (j) and (n) shown in FIG. 12 are detected.

In the torque detecting unit in the conventional steering control device described above, even when the identical construction such that it is composed of the torque detecting coil and the temperature compensating coil is the same (unchanged), various methods may be considered for constructing the circuits that excite the coils and detect the terminal voltages in addition to the above-mentioned conventional technique. Therefore, various types of circuits have been proposed by each torque sensor manufacturer.

As a result, when the torque sensor composed of the circuits designated by the torque sensor manufacturers is incorporated into the torque detecting unit of the steering control device, the number of models necessary for performing signal processing on the output signals from the torque detecting unit increases, so that a vast number of development steps and management steps becomes necessary.

SUMMARY OF THE INVENTION

The present invention has been made to solve the above-mentioned problems, and has as an object to realize a steering control device which is capable of handling a variety of torque sensors with the same single signal processing circuit, and in which a cost increase is suppressed while taking sufficient failsafe measures.

A steering control device according to the present invention comprises: a torque sensor for detecting a signal corresponding to a steering torque in a steering system; a first microcontroller for outputting a steering torque signal equivalent to the steering torque; a second microcontroller for controlling an actuator based on the steering torque signal; actuator driving means for driving the actuator controlling the steering system; and storage means in which a steering torque neutral point compensation data is stored in advance. Also, the first microcontroller compensates a neutral point of the steering torque signal based on the neutral point compensation data stored in the storage means.

Also, a steering control device comprises: a torque sensor for detecting a signal corresponding to a steering torque in a steering system; a first microcontroller for outputting a steering torque signal equivalent to the steering torque; a second microcontroller for controlling an actuator based on the steering torque signal; actuator driving means for driving the actuator controlling the steering system; and storage means in which a steering torque gain compensation data is stored in advance. And the first microcontroller compensates an amplitude of the steering torque signal based on the gain compensation data stored in the storage means.

Therefore, the redundancy system is constructed in which, regardless of the type of the signal outputted from the torque sensor, the first microcontroller outputs the steering torque signal and the second microcontroller controls the actuator based on the steering torque signal outputted by the first microcontroller, whereby increased costs needed for calculating the steering torque signal in the redundancy system can be suppressed, and the steering control device in which sufficient failsafe measures have been taken can be realized.

Also, in the steering control device, the first microcontroller comprises a timer for generating a torque sensor drive signal that is a periodical signal for driving the torque sensor. And the first microcontroller comprises a plurality of signal processing programs for calculating the steering torque signal equivalent to the steering torque, based on the signal outputted by the torque sensor, and switches the signal processing programs in accordance with the torque sensor.

In the steering control device, the data stored into the storage means in advance is set from an outside of the steering control device by means of communications. The signal processing program for calculating the steering torque signal equivalent to the steering torque is set from the outside of the steering control device by means of communications. The steering torque signal performs a given phase compensation on a steering torque component included in the output signal from the torque sensor.

Also, in the steering control, the actuator is comprised of a motor. The first microcontroller comprises direction discriminating means for discriminating a direction of the steering torque signal and outputs a first direction-specific actuator drive permission signal indicating a current supply direction of the motor corresponding to the steering torque signal whose direction is determined by the direction distinguishing means. The second microcontroller outputs a second direction-specific actuator drive permission signal indicating a current supply direction of the motor corresponding to the steering torque signal whose direction is distinguished by the direction distinguishing means, and the actuator driving means outputs a current supply direction instruction signal for driving the motor in a direction so that the first direction-specific actuator drive permission signal and the second direction-specific actuator drive permission signal coincide with each other.

Also, in the steering control device, in a case where there is no output from the second microcontroller for a given period of time or longer, the first microcontroller judges that the second microcontroller is abnormal. And the first microcontroller reads out at least one of the first and the second direction-specific actuator drive permission signals and the current supply direction instruction signal, and based on a comparison between the direction-specific actuator drive permission signal and the current supply direction instruction signal which it reads out, determines whether or not the direction-specific actuator drive permission signal that it read out is abnormal. In a case where a given output signal outputted from the torque sensor continues to be outside a given range for a given period of time or longer, the first microcontroller judges that the torque sensor is abnormal. In a case where the first microcontroller judges that the torque sensor is abnormal, the first microcontroller outputs a torque neutral signal as the steering torque signal.

Also, in the steering control device, in a case where the first microcontroller judges that the torque sensor is abnormal, the first microcontroller outputs a signal outside a given range as the steering torque signal. In a case where there is no output from the first microcontroller for a given period of time or longer, the second microcontroller judges that the first microcontroller is abnormal.

Also, in the steering control device, the second microcontroller reads out at least one of the first and the second direction-specific actuator drive permission signals and the current supply direction instruction signal, and based on a comparison between the direction-specific actuator drive permission signal and the current supply direction instruction signal which are read out, determines whether or not the read direction-specific actuator drive permission signal is abnormal. In a case where a given output signal outputted from the torque sensor continues to be outside a given range for a given period of time or longer, the second microcontroller judges that the torque sensor is abnormal.

Also, a steering control device further comprises abnormality detecting means for detecting the abnormality judged by one of the first and the second microcontrollers, and the abnormality detecting means stops the operation of the actuator driving means. In the steering control device, the first and the second microcontrollers are mounted inside the same casing.

BRIEF DESCRIPTION OF THE DRAWINGS

In the accompanying drawings:

FIG. 1 is a block diagram of a steering control device according to Embodiment 1 of the present invention;

FIG. 2 is an operation flow chart of a first microcontroller in the steering control device according to Embodiment 1 of the present invention;

FIG. 3 is an explanatory diagram explaining a compensation processing of a torque detecting value by the first microcontroller in the steering control device according to Embodiment 1 of the present invention;

FIG. 4 is an explanatory diagram explaining a phase compensation processing by the first microcontroller according to Embodiment 1 of the present invention;

DETAILED DESCRIPTION OF THE PREFERRED EMBODIMENTS

Embodiment 1

Figure 5:
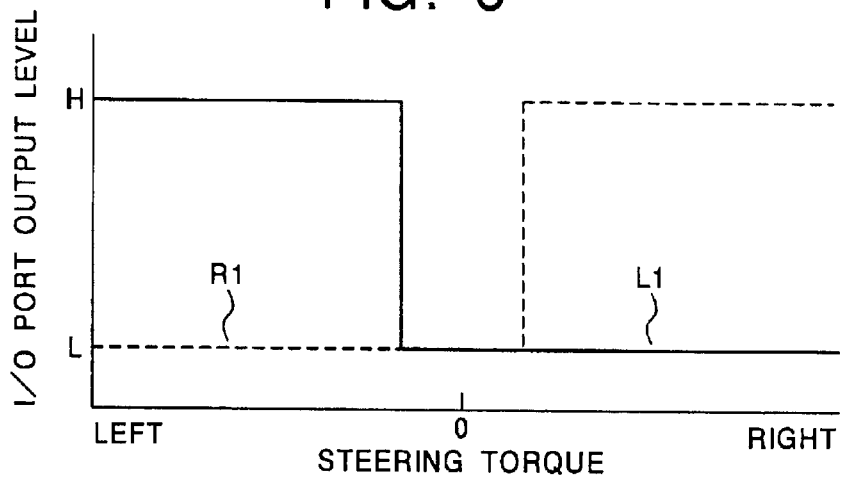
FIG. 5 is an explanatory diagram explaining a direction distinguishing processing of a steering torque by the first microcontroller according to Embodiment 1 of the present invention.

FIG. 1 is a block diagram of a steering control device according to Embodiment 1 of the present invention. Hereinafter, FIG. 1 is used to explain a construction of the steering control device according to Embodiment 1 of the present invention.

In FIG. 1, reference numeral 1 is a steering wheel for a driver to steer a vehicle or the like in which the steering control device is mounted. Reference numeral 2 is a steering column joined to the steering wheel 1, transmitting a steering force of the steering wheel 1 produced by the driver.

Reference numeral 3 is a torque detecting unit for detecting steering force at a time when the driver steered the steering wheel 1. The torque detecting unit 3 includes a torsion bar 31 for generating a torsion angle proportionate to the driver's steering force, a torque detecting coil 32 for converting the torsion angle generated by the torsions bar 31 into an inductance value, and a temperature compensating coil 33 for compensating for the temperature characteristic of the torque detecting coil 32.

Further, the torque detecting unit 3 has a smoothing circuit 35 for smoothing a rectangular wave outputted by the first microcontroller 7 described later, to obtain an exciting signal having a sinusoidal waveform; an electric current amplifying circuit 34 for amplifying the electric current of the exciting signal outputted by the smoothing circuit 35 to drive the torque detecting coil 32 and the temperature compensating coil 33; and a differential amplifying circuit 36 for amplifying the voltage difference between the terminal voltages of the torque detecting coil 32 and the temperature compensating coil 33 to compensate for the temperature characteristic of the torque detecting coil 32 and amplifying the amplitude of the terminal voltages.

Further, reference numeral 4 is a motor for controlling the steering system, reference numeral 5 is a decelerator for transmitting output torque of the motor 4 to the steering column 2, and reference numeral 6 is a steering control device for driving and controlling the motor 4.

The steering control device 6 includes an exciting circuit 34, a smoothing circuit 35 and the differential amplifying circuit 36 which constitute an electrical circuit section of the torque detecting unit 3, and further includes a first microcontroller 7 having as its constitutive elements a CPU 71, a timer 72, and A/D converter 73, an EEPROM 74, a RAM 75, a ROM 76, an I/O port 77, a serial communication interface 78.

Further, the steering control device 6 also has as it constitutive element a second microcontroller 8 for performing main control on the motor 4; a logical circuit 9 for generating a motor 4 drive signal based on an instruction from the first microcontroller 7 and the second microcontroller 8; a motor drive circuit 10 for driving the motor 4 based on the signal generated by the logical circuit 9; and an electric current detecting circuit 11 for detecting an electric current of the motor 4.

Detailed explanation is made of an operation based a signal processing program stored in the ROM 76 of the first microcontroller 7 in the construction described above.

First, at the first microcontroller 7, the rectangular wave on the given period is outputted from the timer 72 to the smoothing circuit 35 of the torque detecting unit 3, and an output signal outputted by the differential amplifying circuit 36 of the torque detecting unit 3 is converted by the A/D converter 73 on a given period and is read.

Note that the torque detection coil 32 and the temperature compensating coil 33 are in the same temperature environment, and the coil temperature characteristics are compensated by the differential amplification.

FIG. 2 is a flow chart representing a program that is booted synchronously with the completion of the A/D conversion. Below, explanation is made based on FIG. 2.

When the A/D conversion of the output voltage signal from the differential amplifying circuit 36 is finished, at step 1 a conversion result is written into the RAM 75.

Next, at step S2, detection is performed in order to remove, from the A/D conversion result, a periodical component included in the coil drive signal that is based on the timer 72, to thereby extract the steering torque signal corresponding to the steering torque.

Further, at step S3, a neutral point of the torque signal obtained as the result of the detection performed at step S2 is compensated based on a neutral point compensation value that has been stored into the EEPROM 74 in advance by a given method using a communication or the like from a location that is external to the steering control device 6.

Further, at step S4, the amplitude of the torque sensor whose neutral point was compensated for at step S3 is compensated based on a gain compensation value that is similarly stored in the EEPROM 74.

These steps enable compensation of a slip in the neutral point or a slip in the gain in the detected torque as compared against the actual torque of the torque detecting unit 34, as shown in FIG. 3, for example.

The torque detection value obtained as described above is phase compensated at step S5. This increases the stability of a torque control system and improves steering feeling. The phase compensation has phase lead and phase lag characteristics such as shown in FIG. 4, for example.

Next, at step S6, a direction of the steering torque is distinguished at step S6 as shown in FIG. 5 based on the steering torque signal that was phase compensated at step S5, and then this is outputted to the I/O port 77.

In FIG. 5, reference symbol R1 is a first right-direction drive permission signal to the right direction and reference symbol L1 is a first left-direction drive permission signal. At the I/O port 77, a level H represents drive permission and a level L represents drive prohibition.

As shown in FIG. 1, a logical circuit 9 takes logical products of a second right-direction actuator drive permission signal R2 and a second left-direction drive permission signal L2 which are outputted from the second microcontroller 8, and of the first right-direction drive permission signal R1 and a first left-direction drive permission signal L1, and the motor is constructed to drive in the direction that the two logical products match each other. Thus, the first microcontroller 7 functions as a redundancy system preventing the motor from driving in an opposite direction from the steering torque due to runaway of the second microcontroller 8.

Further, as shown in FIG. 1, an output signal from the logical circuit 9 is read out into the I/O port 77, and in the case where the first microcontroller 7 prohibits driving but the logical circuit 9 permits driving, it is determined that the I/O port 77 or the logical circuit 9 is broken down.

When a breakdown is determined, at step S8 mentioned below, the second microcontroller 8 is informed that there is a breakdown, or the steering torque signal outputted to the second microcontroller 8 is sent out as a torque neutral signal to stop the motor drive, or some other such failsafe measure is taken.

Figure 6:
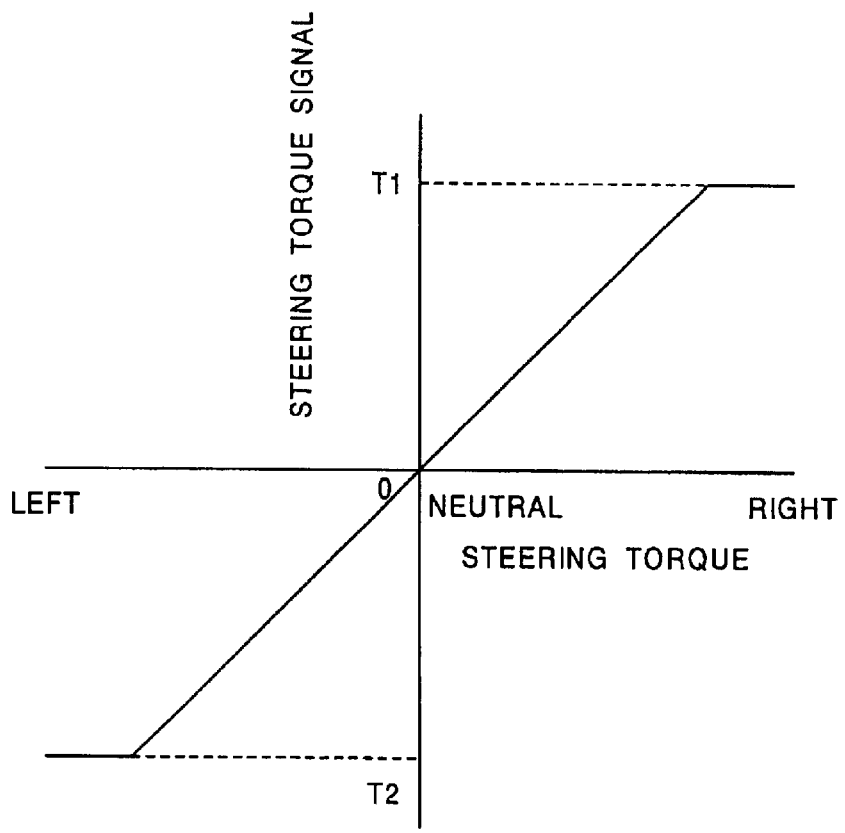
FIG. 6 is a correlation diagram between the steering torque and a steering torque signal in the steering control device according to Embodiment 1 of the present invention.
Figure 8:
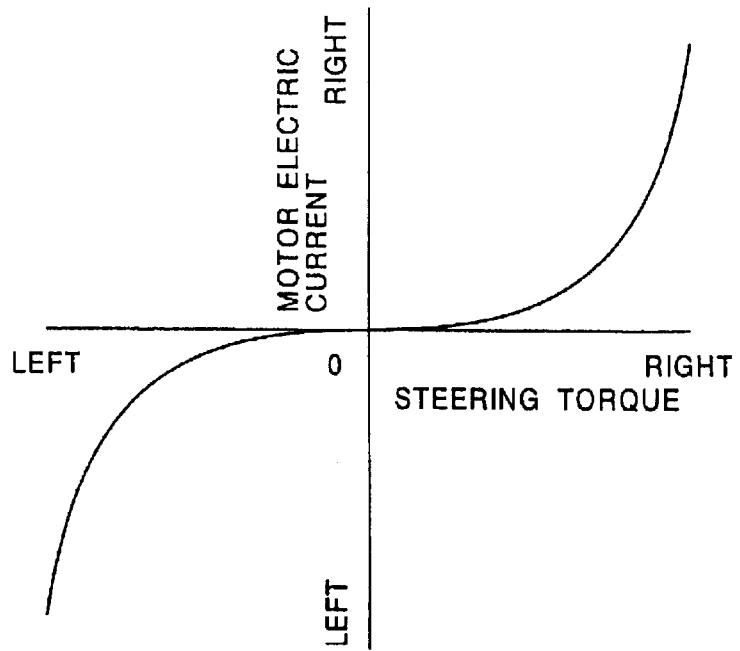
FIG. 8 is an explanatory diagram explaining a motor target electric current calculation by the second microcontroller in the steering control device according to Embodiment 1 of the present invention.

Here, FIG. 6 is a correlation diagram showing an example of the steering torque and the steering torque signal. The second microcontroller 8 determines the motor electric current based on a characteristic of the steering torque and the motor electric current, as shown in FIG. 8. Therefore, the motor drive can be stopped by the first microcontroller outputting the torque neutral signal, which is the neutral point in FIG. 6.

At step S7, it is determined whether the torque detecting unit 3 has broken down. For example, in the case where the output voltage of the differential amplifying circuit 36 continues to be in the outside of a given range for a given period of time or longer, the breakdown is determined.

In the case where the breakdown has been determined, the above-mentioned motor drive permission signals R1 and L1 are both set at level L and the motor drive is prohibited, or, at step S8 described below, the second microcontroller 8 is informed of the breakdown. Alternatively, as described above, the torque neutral signal is outputted to the second microcontroller 8 to stop the motor drive or some other such failsafe measure is taken.

Finally, at step S8, the phase-compensated steering torque signal that was calculated at step S5, and the breakdown determination result from steps S6 and S7, are sent via a serial communications interface 78 to the second microcontroller 8.

Further, after the data is sent, in the case where a given signal does not come back from the second microcontroller 8 within a given period of time, it is determined that the second microcontroller 8 has broken down. For example, the above-mentioned motor drive permission signals R1 and L1 are both set to level L and the motor drive is prohibited, or some other such failsafe measure is taken.

Thus, the first microcontroller 7 operates based on the signal processing program stored in the ROM 76.

Next, operation of the second microcontroller 8 is explained based on the flow chart in FIG. 6.

Figure 7:
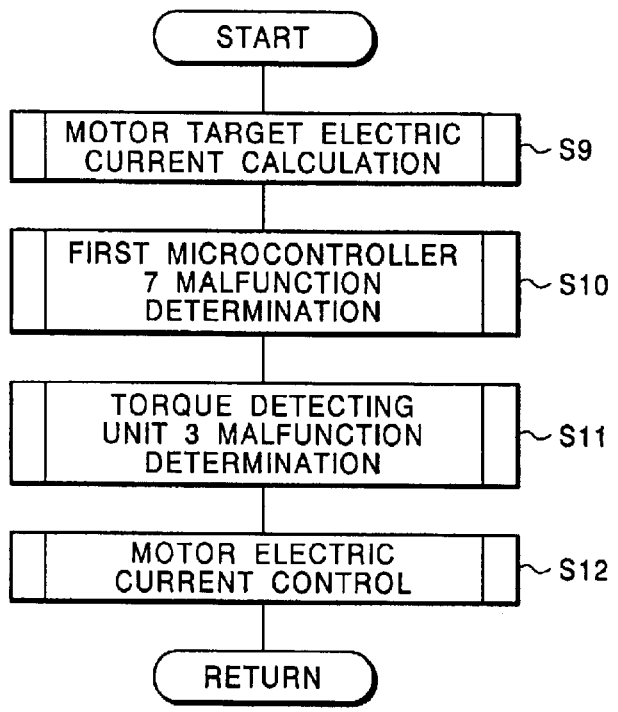
FIG. 7 is an operation flow chart of a second microcontroller in the steering control device according to Embodiment 1 of the present invention.

The program in FIG. 7 is called up separately by a superior program according to a given period. Further, each time the data sent from the first microcontroller 7 is received, it is forwarded to the RAM 75 by means of interruption processing.

First, at step S9, a motor target electric current having a characteristic as shown in FIG. 8, for example, is calculated based on the steering torque signal received from the first microcontroller 7.

Next, at step S10, there is provided a receiving-period monitoring means which measures the period of the above-mentioned interruption processing in receiving the data from the first microcontroller 7, to monitor data sending/receiving periods of the first microcontroller 7. In the case where the data sending period is outside a given range, it is determined that the first microcontroller 7 has broken down, and the above-mentioned motor target electric current is set to 0, or some other such failsafe measure is taken.

Further, at step S11, it is determined whether the torque detecting unit 3 has broken down, according to the above-mentioned breakdown determination results received from the first microcontroller 7. Further, in the case where the steering torque signal received from the first microcontroller 7 is outside the given range as well, it is determined that the torque detecting unit 3 or the microcontroller 7 has broken down.

Here, the steering torque signal which is outside the given range refers to the case where the steering torque signal is greater than T1 or less than T2 in the example of the steering torque and the steering torque signal shown in FIG. 6.

When the breakdown has been determined, the above-mentioned motor target electric current is set to 0, or some other failsafe measure is taken, similarly to step S10.

Finally, at step S12, a motor drive direction instruction R2 or L2 is outputted to the logical circuit 9 in accordance with the above-mentioned motor target electric current, and the motor electric current from the motor electric current detecting circuit 11 is feedback controlled in accordance with a motor-detection electric current, and a PWM control signal is outputted to a motor drive circuit 10 to perform PWM control on the motor 4.

According to the above, the motor drive circuit 10 drives the motor 4.

As described above, in accordance with the steering control device according to Embodiment 1 of the present invention, the signal processing of the torque sensor is realized by means of the signal processing program of the first microcontroller 7. Thus, various manufacturer-designated torque sensors in the torque detecting unit 3 can be handled with the steering control device having the same hardware construction, just by changing the signal processing program (software) stored in the ROM 76.

Further, the redundancy system of the second microcontroller 8 for performing the main steering controls can be constructed with few parts.

Note that, in accordance with Embodiment 1 of the present invention, it is possible to suppress the phase lag, which is advantageous, and therefore, the phase compensation of step S5 was realized in the first microcontroller 7. However, it is also possible to realize the phase compensation at the second microcontroller 8. In this case, it is possible to reduce the processing by the first microcontroller 7, and a less expensive microcontroller can be used.

Further, the EEPROM 74 was built into the first microcontroller 7; however, a construction can also be taken in which the EEPROM 74 is placed outside the first microcontroller 7, and is read by means of a given communications means. In this case, a less expensive microcontroller can be used.

Further, in this embodiment, the first microcontroller 7 monitored the motor drive direction permission signal from the first microcontroller 7; however, it is also possible for the second microcontroller 8 to monitor this. In this case, the processing by the first microcontroller 7 can be reduced, and a less expensive microcontroller can be used.

Further, in this embodiment, the first microcontroller 7 had only one type of signal processing program in the ROM 76; however, the first microcontroller 7 have a plurality of programs, and use a jumper cable from the external location to change the setting of the EEPROM 74 via a communication, to thereby change the period of the coil drive signal or other such part of the signal processing method.

Further, instead of the ROM 76, it is also possible to use a flash ROM or other such non-volatile memory, thus adopting a method in which programming can be done at any time from the external location. In this case, a variety of torque detecting units 3 can be handled more flexibly.

Further, a construction can also be adopted in which the first microcontroller 7 and the second microcontroller 8 are mounted inside the same case.

Embodiment 2

A steering control device according to Embodiment 2 of the present invention uses a high-functionality construction for the microcontroller 7, to reduce the number of parts.

Figure 9:
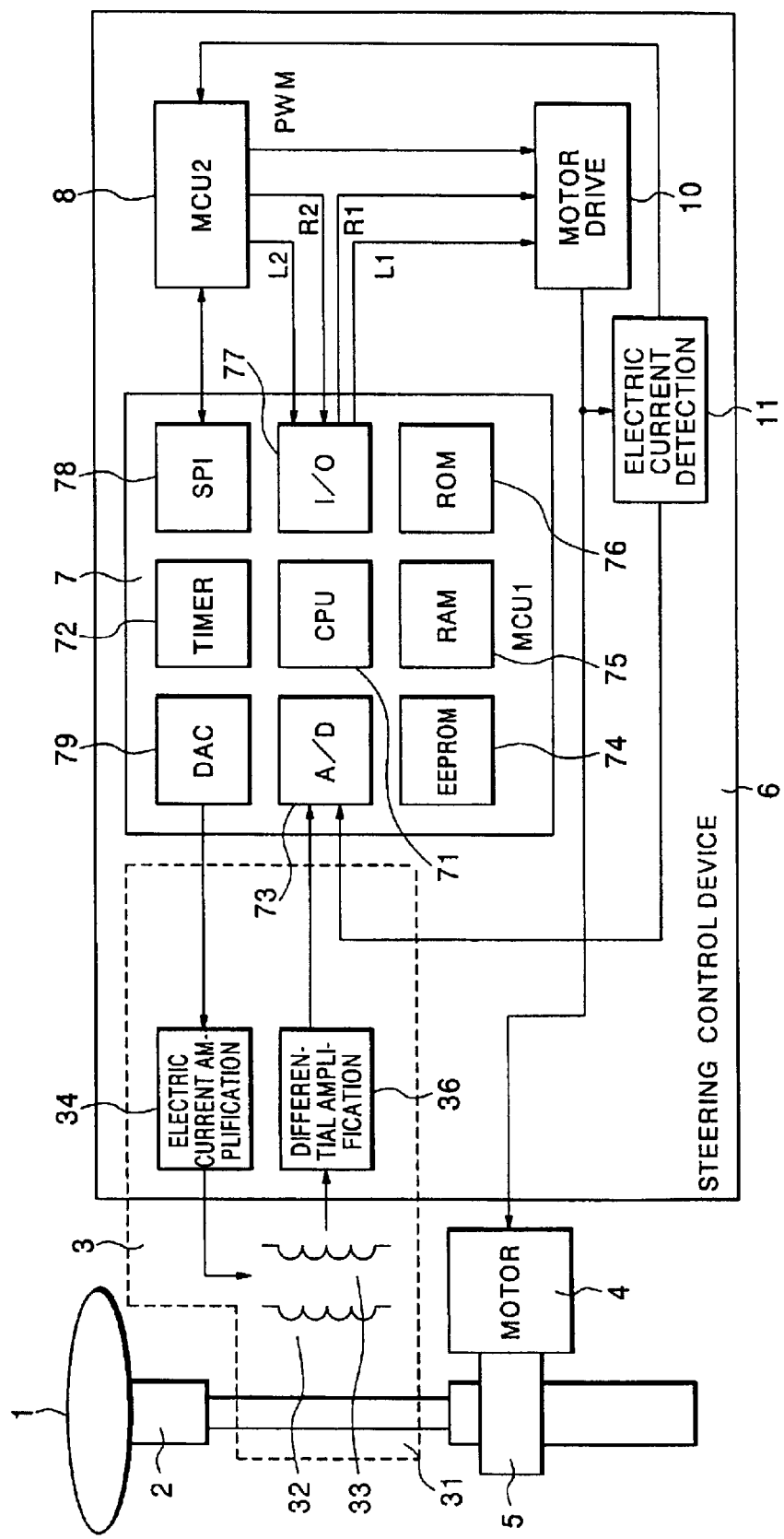
FIG. 9 is a block diagram of a steering control device according to Embodiment 2 of the present invention.

FIG. 9 is a block diagram of the steering control device according to Embodiment 2 of the present invention. Hereinafter, FIG. 9 is used to explain the construction.

In the diagram, reference numeral 79 denotes a D/A converter for outputting an analog signal. Note that, the same reference numerals are applied to constructions having similar functions as in Embodiment 1, and explanations thereof are omitted.

Next, explanation is made of an operation of the steering control device according to Embodiment 2 of the present invention.

In accordance with Embodiment 1, the rectangular wave was smoothed via the smoothing circuit 35 and thus the sinusoidal waveform coil drive signal was obtained. However, in accordance with this embodiment, a sinusoidal wave is outputted directly from the D/A converter 79, whereby eliminating the smoothing circuit 35.

Further, in accordance with Embodiment 1, the logical circuit 9 took the logical product of the first microcontroller 7 drive permission signals R1 and L1, and of the second microcontroller 8 drive direction instruction signals R2 and L2, to generate the drive direction signal for the motor drive circuit 10. However, in accordance with Embodiment 2, the drive direction instruction signals R2 and L2 for the second microcontroller 8 are inputted into the I/O port 77 of the first microcontroller 7, and the software of the first microcontroller 7 takes the logical product of the drive permission signals R1 and L1 and outputs, from the I/O port 77, a drive instruction signal to be given to the motor drive circuit 10, thereby eliminating the logical circuit 9.

Further, the drive permission signal R1 or L1 from the first microcontroller 7 is determined based on a motor electric current detection value of the motor electric current detecting circuit 11.

Figure 10:
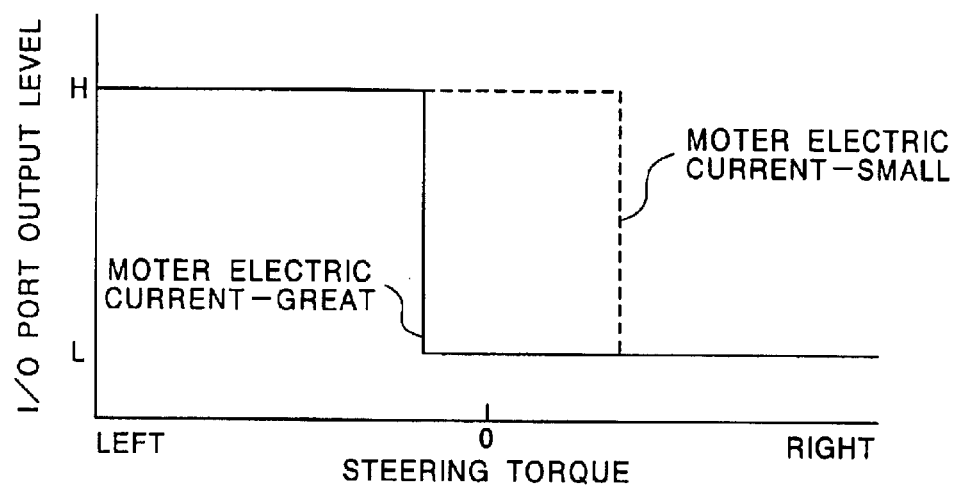
FIG. 10 is an explanatory diagram explaining a steering torque direction distinguishing processing by a first microcontroller in the steering control device according to Embodiment 2 of the present invention.
Figure 11:
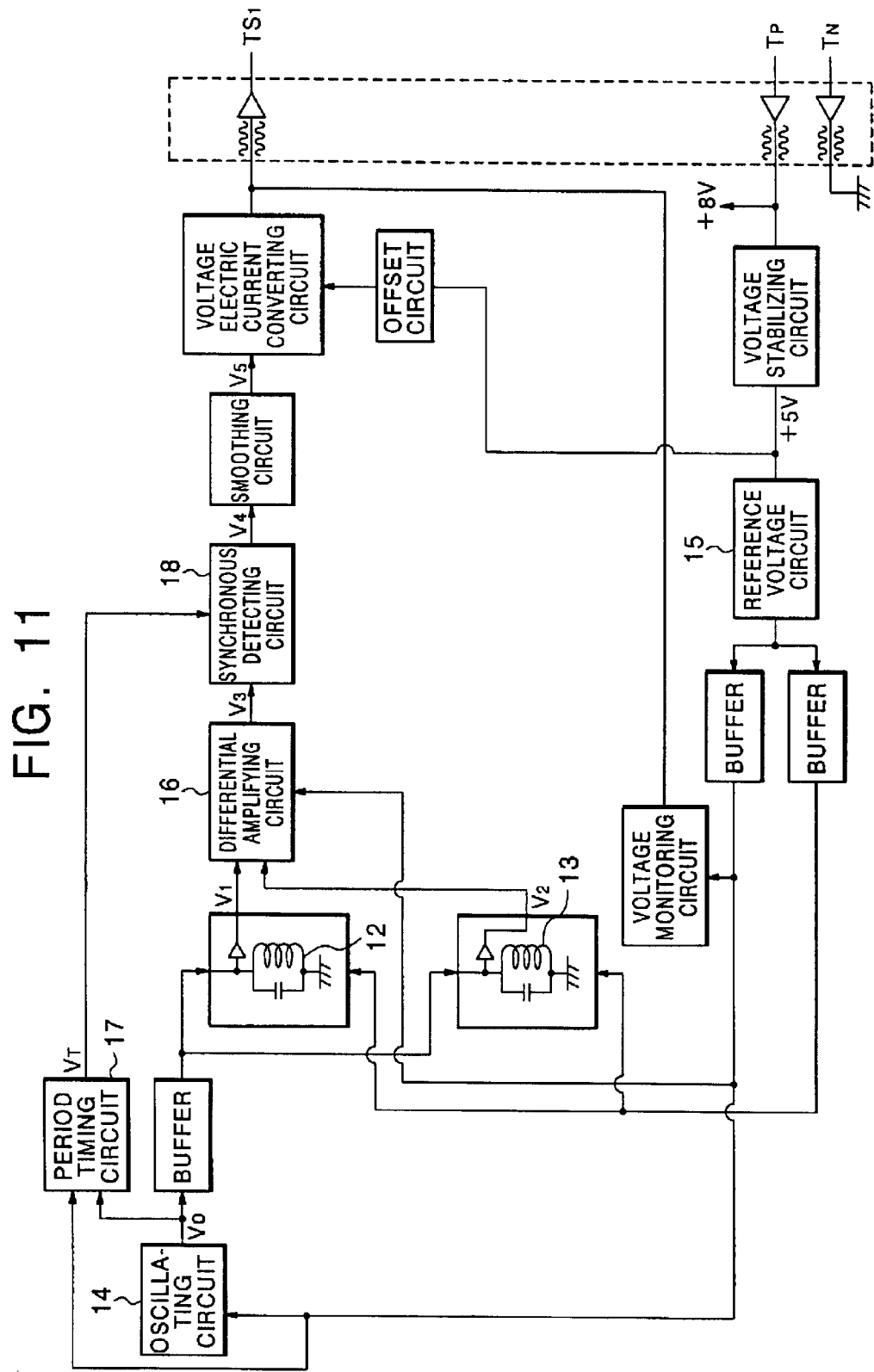
FIG. 11 is a block diagram of a torque sensor signal processing circuit used in a conventional steering control device.
Figure 12:
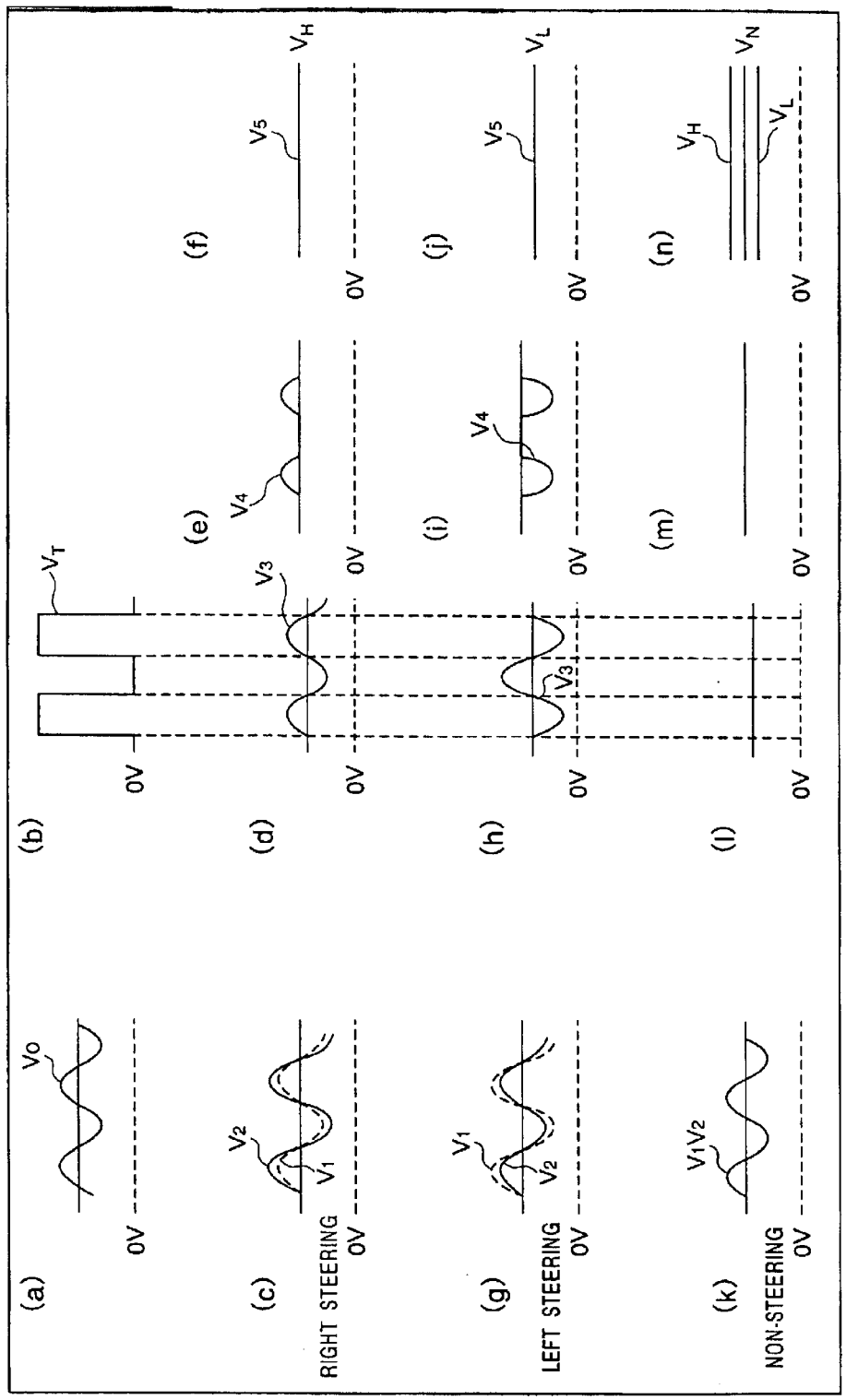
FIG. 12 is a diagram of signal waveforms of respective parts of the torque sensor signal processing circuit used in the conventional steering control device.

FIG. 10 is an explanatory diagram taking the left-direction drive permission signal L1 as an example. There is a characteristic that, when the motor electric current is below a given value, the motor drive toward the left direction is permitted until the steering torque reaches a given value in the right direction, but when the motor electric current increases, the motor drive toward the left direction is not permitted until the steering torque becomes above a given value on the left, as in Embodiment 1. Although it is not shown in the diagram, the right-direction drive permission signal R1 is generated similarly.

As a result, when the steering torque is near neutral, a motor electric current of less than the given value can drive the motor toward either the left or the right, to thereby improve the steering feeling.

Further, when the motor electric current is great, the operation is similar to Embodiment 1. Therefore, the redundancy system of the second microcontroller 8 also operates without a problem.

As described above, in accordance with the steering control device according to Embodiment 2 of the present invention, a high-functionality construction is employed in the first microcontroller 7. Therefore, the number of parts in the steering control device 6 can be reduced, and the steering feeling can be improved.

In accordance with the steering control device according to the present invention, the redundancy system is constructed in which, regardless of the type of the signal outputted from the torque sensor, the first microcontroller outputs the steering torque signal and the second microcontroller controls the actuator based on the steering torque signal outputted by the first microcontroller, whereby increased costs needed for calculating the steering torque signal in the redundancy system can be suppressed, and the steering control device in which sufficient failsafe measures have been taken can be realized.

What is claimed is:

1. A steering control device comprising:
    a torque sensor for detecting a signal corresponding to a steering torque in a steering system;
    a first microcontroller for outputting a steering torque signal equivalent to the steering torque based on a signal outputted from the torque sensor;
    a second microcontroller for controlling an actuator based on the steering torque signal outputted from the first microcontroller;
    actuator driving means for driving the actuator controlling the steering system based on the control performed by the second microcontroller; and
    storage means in which a compensation data for compensating the steering torque signal is stored in advance;
    wherein the first microcontroller compensates a neutral point of the steering torque signal based on the compensation data stored in the storage means.

2. A steering control device according to claim 1, wherein the compensation data is a steering torque neutral point compensation data.

3. A steering control device according to claim 1, wherein the compensation data is a steering torque gain compensation data.

4. A steering control device according to claim 1, wherein the first microcontroller comprises a timer for generating a torque sensor drive signal that is a periodical signal for driving the torque sensor.

5. A steering control device according to claim 1, wherein the first microcontroller comprises a plurality of signal processing programs for calculating the steering torque signal equivalent to the steering torque, based on the signal outputted by the torque sensor, and switches the signal processing programs in accordance with the torque sensor.

6. A steering control device according to claim 1, wherein the data stored into the storage means in advance is set from an outside of the steering control device by means of communications.

7. A steering control device according to claim 5, wherein the signal processing program for calculating the steering torque signal equivalent to the steering torque is set from the outside of the steering control device by means of communications.

8. A steering control device according to claim 1, wherein the steering torque signal performs a given phase compensation on a steering torque component included in the output signal from the torque sensor.

9. A steering control device according to claim 1, wherein the actuator is comprised of a motor;

wherein the first microcontroller comprises direction discriminating means for discriminating a direction of the steering torque signal, and outputs a first direction-specific actuator drive permission signal of the motor in accordance with the steering torque signal whose direction is determined by the direction distinguishing means;

wherein the second microcontroller outputs a second direction-specific actuator drive permission signal indicating a current supply direction of the motor in accordance with the steering torque signal whose direction is distinguished by the direction distinguishing means; and wherein the actuator driving means outputs a current supply direction instruction signal for driving the motor in a direction so that the first direction-specific actuator drive permission signal and the second direction-specific actuator drive permission signal coincide with each other.

10. A steering control device according to claim 1, wherein, in a case where there is no output from the second microcontroller for a given period of time or longer, the first microcontroller judges that the second microcontroller is abnormal.

11. A steering control device according to claim 9, wherein the first microcontroller reads out at least one of the first and the second direction-specific actuator drive permission signals and the current supply direction instruction signal, and based on a comparison between the direction-specific actuator drive permission signal and the current supply direction instruction signal which are read out, determines whether or not the read direction-specific actuator drive permission signal is abnormal.

12. A steering control device according to claim 1, wherein, in a case where a given output signal outputted from the torque sensor continues to be outside a given range for a given period of time or longer, the first microcontroller judges that the torque sensor is abnormal.

13. A steering control device according to claim 12, wherein, in a case where the first microcontroller judges that the torque sensor is abnormal, the first microcontroller outputs a torque neutral signal as the steering torque signal.

14. A steering control device according to claim 12, wherein, in a case where the first microcontroller judges that the torque sensor is abnormal, the first microcontroller outputs a signal outside a given range as the steering torque signal.

15. A steering control device according to claim 1, wherein in a case where there is no output from the first microcontroller for a given period of time or longer, the second microcontroller judges that the first microcontroller is abnormal.

16. A steering control device according to claim 9, wherein the second microcontroller reads out at least one of the first and the second direction-specific actuator drive permission signals and the current supply direction instruction signal, and based on a comparison between the direction-specific actuator drive permission signal and the current supply direction instruction signal which are read out, determines whether or not the direction-specific actuator drive permission signal is abnormal.

17. A steering control device according to claim 1, wherein, in a case where a given output signal outputted from either the torque sensor or the first microcontroller continues to be outside a given range for a given period of time or longer, the second microcontroller judges that the torque sensor is abnormal.

18. A steering control device according to claim 1, further comprising abnormality detecting means for detecting the abnormality judged by one of the first and the second microcontrollers, wherein the abnormality detecting means stops the operation of the actuator driving means.

19. A steering control device according to claim 1, wherein the first and the second microcontrollers are mounted inside the same casing.

* * * * *